United States Patent
Kitazawa

(10) Patent No.: US 8,359,826 B2
(45) Date of Patent: Jan. 29, 2013

(54) TROUBLE DIAGNOSIS DEVICE AND TROUBLE DIAGNOSIS METHOD FOR NO$_x$ SENSOR

(75) Inventor: Eiichi Kitazawa, Saitama (JP)

(73) Assignee: Bosch Corporation, Tokyo (JP)

( * ) Notice: Subject to any disclaimer, the term of this patent is extended or adjusted under 35 U.S.C. 154(b) by 547 days.

(21) Appl. No.: 12/525,408

(22) PCT Filed: Jan. 25, 2008

(86) PCT No.: PCT/JP2008/051059
§ 371 (c)(1),
(2), (4) Date: Jul. 31, 2009

(87) PCT Pub. No.: WO2008/093607
PCT Pub. Date: Aug. 7, 2008

(65) Prior Publication Data
US 2010/0031633 A1 Feb. 11, 2010

(30) Foreign Application Priority Data

Feb. 2, 2007 (JP) ................................. 2007-024213

(51) Int. Cl.
*F01N 11/00* (2006.01)
*G01M 15/10* (2006.01)
(52) U.S. Cl. ........ 60/277; 123/198 D; 123/585; 123/688
(58) Field of Classification Search ..................... 60/277; 123/198 D, 585, 688
See application file for complete search history.

(56) References Cited

U.S. PATENT DOCUMENTS

| 5,423,203 | A | 6/1995 | Namiki et al. |
|---|---|---|---|
| 5,584,172 | A * | 12/1996 | Oguchi et al. ................. 60/39.5 |
| 6,453,663 | B1 * | 9/2002 | Orzel et al. ..................... 60/277 |
| 6,823,843 | B1 * | 11/2004 | Goralski et al. ............... 123/435 |
| 2003/0061803 | A1 * | 4/2003 | Iihoshi et al. .................... 60/285 |
| 2004/0211171 | A1 * | 10/2004 | Nakagawa et al. ............. 60/285 |
| 2006/0130458 | A1 * | 6/2006 | Solbrig ........................... 60/286 |

FOREIGN PATENT DOCUMENTS

| DE | 10049685 A1 | 4/2002 |
|---|---|---|
| DE | 10062289 A1 | 7/2002 |
| JP | 634597 A | 2/1994 |
| JP | 6264724 A | 9/1994 |
| JP | 3134698 B2 | 2/2001 |
| JP | 2003270194 A | 9/2003 |
| JP | 2004270468 A | 9/2004 |

OTHER PUBLICATIONS

DE 10049685 Machine Translation.*

* cited by examiner

*Primary Examiner* — Kenneth Bomberg
*Assistant Examiner* — Brandon Lee
(74) *Attorney, Agent, or Firm* — Michael Best & Friedrich LLP

(57) ABSTRACT

A trouble diagnosis device and method for an NO$_x$ sensor for determining abnormality of an NO$_x$ sensor used in an exhaust gas purification system. The device can perform a trouble diagnosis without forcedly creating a diagnosis mode during operation of an internal combustion engine and without deterioration of drivability or fuel consumption. The device detects the time-lapse variation of the exhaust NO$_x$ flow rate suitable for diagnosis in a normal operation mode and determines whether the NO$_x$ sensor responds with following this variation.

1 Claim, 11 Drawing Sheets

TROUBLE DIAGNOSIS DEVICE AND TROUBLE DIAGNOSIS METHOD FOR $NO_x$ SENSOR

TECHNICAL FIELD

The present invention relates to a trouble diagnosis device for an $NO_x$ sensor and a trouble diagnosis method for an $NO_x$ sensor, and particularly relates to a trouble diagnosis device for an $NO_x$ sensor and a trouble diagnosis method for an $NO_x$ sensor to enhance the precision of trouble diagnosis for the $NO_x$ sensor.

BACKGROUND ART

Particular matter (PM), $NO_x$ (NO or $NO_2$), etc. which may have a risk of affecting the environment are contained in exhaust gas discharged from an internal combustion engine such as a diesel engine or the like. An exhaust gas purification system having an $NO_x$ catalyst disposed in an exhaust gas passage is known as an exhaust gas purification system used to purify $NO_x$ out of the above materials.

An exhaust gas purification system using $NO_x$ storage catalyst and an SCR (Selective Catalytic Reduction) system using selective reduction catalyst are known as such an exhaust gas purification system. Accordingly to the exhaust gas purification system using the $NO_x$ storage catalyst, $NO_x$ in exhaust gas is absorbed under the state that the air-fuel ratio of the exhaust gas is under a lean state, and when the air-fuel ratio of the exhaust gas is changed to a rich state, $NO_x$ is subjected to reductive reaction with hydro carbon (HC) and carbon oxide (CO) in the exhaust gas while $NO_x$ is discharged, thereby purifying the exhaust gas. Furthermore, the SCR system uses catalyst for selectively reducing $NO_x$ in exhaust gas and supplies reducing agent mainly containing urea or HC into the exhaust gas so that $NO_x$ is subjected to reductive reaction with the catalyst, thereby purifying the exhaust gas.

In these exhaust gas purification systems, an $NO_x$ sensor is normally disposed in an exhaust gas passage at the upstream side or downstream side of an $NO_x$ catalyst, and used to determine an injection amount of reducing agent and control the operation state of an internal combustion engine so that purification of $NO_x$ is efficiently performed. Furthermore, the $NO_x$ sensor may be used to diagnose whether the exhaust gas purification system operates normally or not. Accordingly, high reliability is required to the output of the $NO_x$ sensor.

Therefore, there has been proposed a device for determining abnormality of an $NO_x$ sensor used in an exhaust gas purification system.

For example, an $NO_x$ sensor abnormality determining device for determining abnormality of an $NO_x$ sensor which implements a flow shown in FIG. 10 and performs proper reproduction of $NO_x$ storage catalyst have been disclosed (see Patent Document 1). The $NO_x$ sensor is provided at the exhaust gas downstream side of $NO_x$ storage catalyst, and the $NO_x$ sensor abnormality determining device comprises $NO_x$ discharging means for forcedly generating a state that $NO_x$ in the $NO_x$ storage catalyst is discharged, real $NO_x$ reduction rate setting means for calculating an actual $NO_x$ reduction rate of the $NO_x$ storage catalyst under the state that $NO_x$ is discharged by the $NO_x$ discharging means, reference $NO_x$ reduction rate setting means for presetting a reference $NO_x$ reduction rate on the basis of the operation state of an engine, and abnormality determining means for comparing the actual $NO_x$ reduction rate with the reference $NO_x$ reduction rate to determine abnormality of the $NO_x$ sensor.

Furthermore, an air-fuel ratio sensor, a gas sensor, etc. are further known as sensors provided in the exhaust gas passage of the internal combustion engine, and methods of diagnosing deterioration of these sensors have been also proposed.

For example, there has been proposed a deterioration diagnosis device for an air-fuel ratio sensor in which preliminary diagnosis is performed under air-fuel ratio feedback control to implement a flow shown in FIG. 11, and deterioration diagnosis following forced vibration is performed in accordance with the preliminary diagnosis result. More specifically, there has been disclosed a deterioration diagnosis device comprising an air-fuel ratio sensor for detecting the air-fuel ratio of air-fuel mixture, air-fuel ratio control means for executing feedback control on the air-fuel ratio of the air-fuel mixture on the basis of a detection signal of the air-fuel ratio sensor, detection capability determining means for determining detection capability of the air-fuel ratio sensor on the basis of the detection signal of the air-fuel ratio sensor, forced variation means for forcedly varying the air-fuel ratio of the air-fuel mixture in preference to the air-fuel ratio control means under a predetermined condition, and deterioration determining means for determining deterioration of the air-fuel ratio sensor on the basis of the detection signal of the air-fuel ratio sensor when the forced variation is performed by the forced variation means (see Patent Document 2).

Patent Document 1: JP-A-2004-270468 (Scope of claim for Patent)

Patent Document 2: Patent Number JP 3134698 (Scope of claim for Patent)

DISCLOSURE OF THE INVENTION

Problem to be Solved by the Invention

However, in the abnormality determining device for the $NO_x$ sensor described in Patent Document 1 and in the deterioration diagnosis device for the air-fuel ratio sensor described in Patent Document 2, at the diagnosis time, it is determined whether a desired detection value is obtained by forcedly varying the $NO_x$ amount and the air-fuel ratio which are detection targets of the sensors. That is, even when the internal combustion engine is under operation, it is required to vary the operation state to perform proper determination as to the responsiveness of the sensor, which causes a risk that drivability is affected or fuel consumption gets worse.

Therefore, the inventors of this invention have made an enthusiastic effort, and found that the above problem can be solved by presetting a reference pattern of time-lapse variation of an exhaust $NO_x$ flow rate suitable for trouble diagnosis without forcedly varying the $NO_x$ flow rate in exhaust gas and determining the responsiveness of the $NO_x$ sensor when this reference pattern is applicable when the trouble diagnosis of the $NO_x$ sensor is performed, thereby implementing the present invention.

That is, an object of the present invention is to provide an $NO_x$ sensor trouble diagnosis device and an $NO_x$ trouble diagnosis method that can perform trouble diagnosis on a timely basis without intentionally creating any diagnosis mode during operation of an internal combustion engine and without deterioration of drivability and fuel consumption.

Means of Solving the Problem

According to the present invention, an $NO_x$ sensor trouble diagnosis device that is provided in an exhaust gas passage of an internal combustion engine and detects the concentration of $NO_x$ in exhaust gas passing through the exhaust gas passage comprises exhaust $NO_x$ flow rate calculating and storing means for calculating and storing an exhaust $NO_x$ flow amount discharged from an internal combustion engine per unit time, detected $NO_x$ concentration storing means for storing a detected $NO_x$ concentration detected by an $NO_x$ sensor, and trouble determining means for defining a reference pattern as a time-lapse variation reference of the exhaust $NO_x$ flow rate and a follow pattern as a time-lapse variation reference of the detected $NO_x$ concentration detected by the $NO_x$ sensor, and determining whether the detected $NO_x$ concentration undergoes a transition while having a predetermined relation with the follow pattern when the exhaust $NO_x$ flow rate undergoes a transition while having a predetermined relation with the reference pattern in a case where the internal combustion engine is in a normal operation mode, thereby determining the responsiveness of the $NO_x$ sensor.

Furthermore, when the $NO_x$ sensor trouble diagnosis device of the present invention is provided, the reference pattern is a pattern containing a constant region in which a first reference value is continued for a fixed time and a slope region in which the first reference value increases at a predetermined increase rate, and the follow pattern is a pattern containing a follow slope region in which a first reference value increases at a predetermined increase rate. The trouble determining means preferably determines whether the detected $NO_x$ concentration undergoes a transition so that it does not dip from the value of the follow ramp region of the follow pattern when the exhaust $NO_x$ flow rate undergoes a transition so that it does not dip from the value of the slope region of the reference pattern.

Furthermore, when the $NO_x$ sensor trouble diagnosis device of the present invention is provided, it is preferable that the trouble determining means is shifted to the determination mode when the exhaust $NO_x$ flow rate reaches the value of a predetermined reference value after it undergoes a transition for a fixed time or more so that it does not exceed the predetermined reference value.

When the $NO_x$ sensor trouble diagnosis device of the present invention is provided, it is preferable that the detected $NO_x$ concentration comparing means sets the value of the detected $NO_x$ concentration at the shift time to the determination mode to an initial value of the follow ramp region of the follow pattern.

When the $NO_x$ sensor trouble diagnosis device of the present invention is provided, it is preferable that the trouble determining means stops the determination mode when the exhaust $NO_x$ flow rate exceeds a predetermined reference value and then dips from the value of the slope region of the reference pattern.

When the $NO_x$ sensor trouble diagnosis device of the present invention is provided, it is preferable that the reference pattern has a delay region for delaying the start position of the slope region by a predetermined time between the constant region and the slope region.

Furthermore, when the $NO_x$ sensor trouble diagnosis device of the present invention is provided, it is preferable that the reference pattern contains a post-stage constant region which is located subsequently to the slope region and in which a second reference value larger than the first reference value is continued for a fixed time, the follow pattern contains a post-stage follow constant region which is located subsequently to the follow ramp region and in which a third reference value is continued for a fixed time, and the trouble determining means determines whether the detected $NO_x$ concentration undergoes a transition so that it does not dip from the value of the follow ramp region and the value of the post-stage follow constant region of the follow pattern when the exhaust $NO_x$ flow rate undergoes a transition so that it does not dip from the value of the slope region and the value of the post-stage constant region of the reference pattern.

When the $NO_x$ sensor trouble diagnosis device of the present invention is provided, it is preferable that the trouble determining means determines the firmly fixing stage of the $NO_x$ sensor by determining whether a predetermined time elapses or not under the state that the detected $NO_x$ concentration does not increase by a predetermined value or more with respect to the value thereof when the exhaust $NO_x$ flow rate exceeds the first reference value while the determination mode is effective.

When the $NO_x$ sensor trouble diagnosis device of the present invention is provided, a trouble diagnosis method for an $NO_x$ sensor which is provided in an exhaust gas passage of an internal combustion engine and detects the concentration of $NO_x$ in exhaust gas passing through the exhaust gas passage comprises: presetting a reference pattern as a criteria for a time-lapse variation of the flow rate of exhaust $NO_x$ exhausted from an internal combustion engine and a follow pattern as a criteria for a time-lapse variation of detected $NO_x$ concentration detected by the $NO_x$ sensor; and determining responsiveness of the $NO_x$ sensor by determining whether the detected $NO_x$ concentration undergoes a transition while having a predetermined relation with the follow pattern when the exhaust $NO_x$ flow rate undergoes a transition while having a predetermined relation with the reference pattern.

Effect of the Invention

According to the present invention, there is provided the trouble determining means for determining whether the detected $NO_x$ concentration of the $NO_x$ sensor undergoes a transition while following variation of the exhaust $NO_x$ flow rate when the exhaust $NO_x$ flow rate from the internal combustion engine varies while having a predetermined relation with a predetermined reference pattern in a normal operation mode, whereby the $NO_x$ sensor trouble diagnosis can be arbitrarily performed under the normal operation state without intentionally creating any diagnosis mode. Accordingly, the responsiveness of the $NO_x$ sensor can be determined without deteriorating the drivability and the fuel consumption. As a result, the reliability of the $NO_x$ sensor can be enhanced, and the purification efficiency of $NO_x$ and the reliability of the trouble diagnosis, etc. of the exhaust gas purification system using the $NO_x$ sensor can be enhanced.

In the $NO_x$ sensor trouble diagnosis device of the present invention, by setting the reference pattern and the follow pattern to predetermined patterns, it can be easily determined whether the detected $NO_x$ concentration detected by the $NO_x$ sensor follows the variation of the exhaust $NO_x$ flow rate.

In the $NO_x$ sensor trouble diagnosis device according to the present invention, the device is shifted to the determination mode when a predetermined condition is satisfied, and thus the device can be shifted to the determination mode after the state that the exhaust $NO_x$ flow rate varies transiently from the state that the exhaust $NO_x$ flow rate is relatively stable is accurately assessed, and thus the trouble diagnosis under the normal operation state can be efficiently performed without frequently repeating ON/OFF of the determination mode.

Furthermore, in the $NO_x$ sensor trouble diagnosis device of the present invention, by setting the value of the detected $NO_x$ concentration at the shift time to the determination mode to the initial value of the follow pattern, it can be easily determined whether the detected $NO_x$ concentration follows the transient increase of the exhaust $NO_x$ flow rate.

Furthermore, in the $NO_x$ sensor trouble diagnosis device of the present invention, the determination mode is stopped when the exhaust $NO_x$ flow rate dips from the value of the slope region after the shift to the determination mode, whereby it can be avoided to perform a diagnosis under a state that it is difficult to determine whether the detected $NO_x$ concentration follows transient variation of the exhaust $NO_x$ flow rate, so that the reliability of the diagnosis result can be enhanced.

Furthermore, in the $NO_x$ sensor trouble diagnosis device of the present invention, the reference pattern has the delay region between the constant region and the slope region, whereby after the shift to the determination mode, the trouble diagnosis can be continued without being stopped even when the exhaust $NO_x$ flow rate is temporarily reduced.

In the $NO_x$ sensor trouble diagnosis device of the present invention, each of the reference pattern and the follow pattern contains the post-stage constant region, whereby it can be more easily determined whether the detected $NO_x$ concentration detected by the $NO_x$ sensor follows the variation of the exhaust $NO_x$ flow rate.

Furthermore, in the $NO_x$ sensor trouble diagnosis method of the present invention, the trouble diagnosis of the $NO_x$ sensor can be performed in the normal operation mode without forcedly creating the diagnosis mode. Accordingly, the trouble diagnosis can be performed without deteriorating the drivability and the fuel consumption.

BEST MODES FOR CARRYING OUT THE INVENTION

Figure 1:
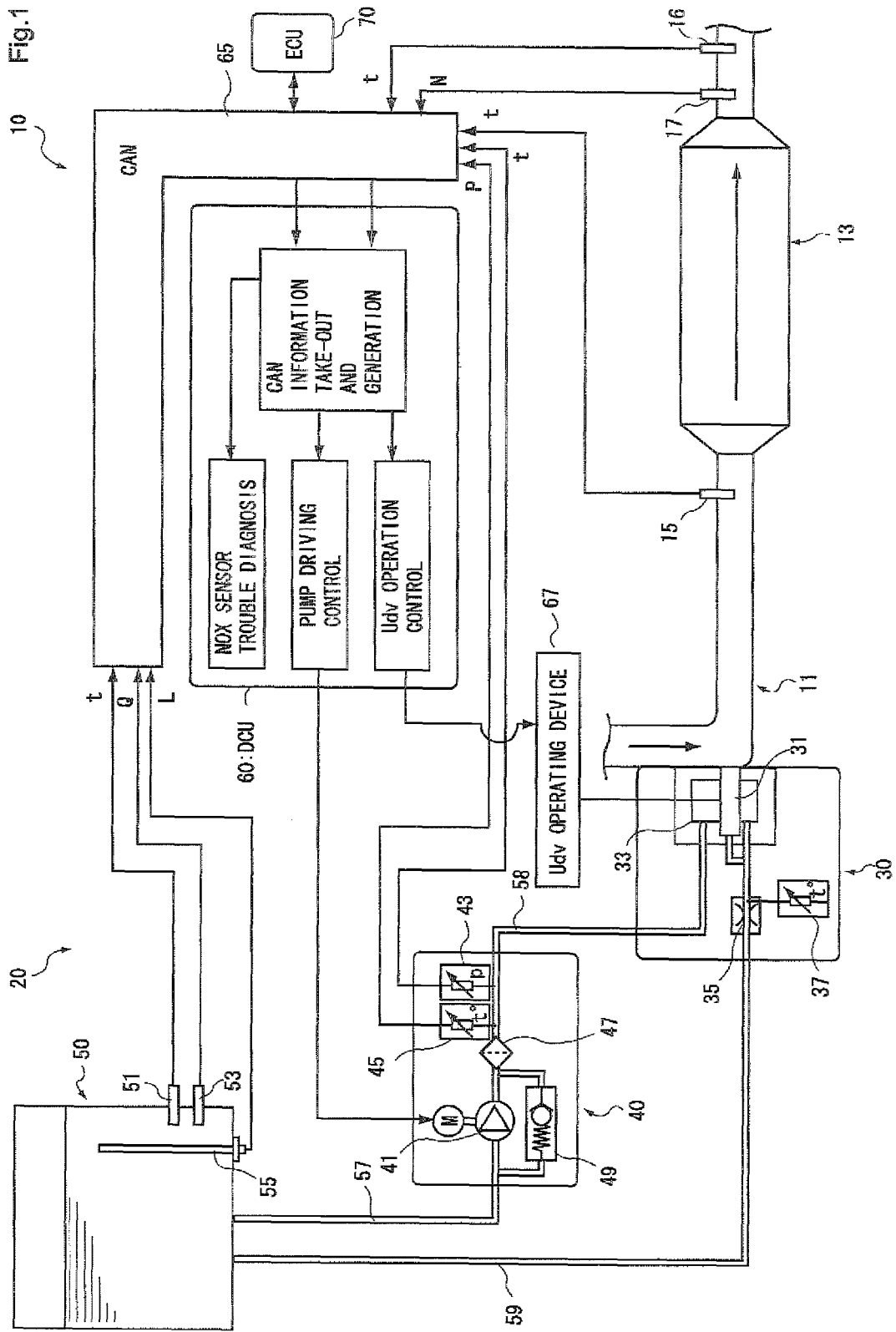
FIG. 1 is a diagram showing an example of the construction of an exhaust gas purification system according to a first embodiment of the present invention

Embodiments of an $NO_x$ sensor trouble diagnosis device and an $NO_x$ sensor trouble diagnosis method according to the present invention will be described hereunder with reference to the drawings. These embodiments are examples of the present invention and do not limit the present invention, and thus any alteration may be made within the scope of the present invention.

In the figures, the same reference numerals represent the same members, and the description thereof is arbitrarily omitted.

First Embodiment

1. Trouble Diagnosis Device for $NO_x$ Sensor (1) Whole Construction of Exhaust Gas Purification System First, an example of the construction of an exhaust gas purification system (hereinafter referred to as "system" in some cases) having an $NO_x$ sensor trouble diagnosis device according to a first embodiment of the present invention will be described with reference to FIG. 1.

An exhaust gas purification system 10 shown in FIG. 1 uses urea water solution as reducing agent, and passes exhaust gas through $NO_x$ catalyst 13 together with the reducing agent to selectively reduce $NO_x$. The exhaust gas purification system 10 has a $NO_x$ catalyst 13 which is disposed at some point of an exhaust gas passage 11 connected to an internal combustion engine and selectively reduces $NO_x$ contained in exhaust gas, and a reducing agent supply device 20 containing a reducing agent injection valve 31 for injecting reducing agent into the exhaust gas passage 11 at the upstream side of the $NO_x$ catalyst 13. Temperature sensors 15 and 16 are disposed at the upstream side and the downstream side of the $NO_x$ catalyst 13 of the exhaust gas passage 11 respectively, and also an $NO_x$ sensor 17 as downstream-side $NO_x$ concentration calculating means is disposed at the downstream side of the $NO_x$ catalyst 13. The constructions of the $NO_x$ catalyst 13, the temperature sensors 15, 16 and the $NO_x$ sensor 17 are not limited to specific ones, and well-known members may be used.

However, in the exhaust gas purification system of this embodiment, at least the $NO_x$ sensor 17 has a trouble diagnosis function for the sensor itself, and outputs error information to CAN (Controller Area Network) 65 described later when an abnormal state is detected.

The reducing agent supply device 20 has an injection module 30 containing a reducing agent injection valve 31, a storage tank 50 in which reducing agent is stocked, a pump module 40 containing a pump 41 for pressure-feeding the reducing agent in the storage tank 50 to the reducing agent injection valve 31, and a control unit (hereinafter referred to as "DCU: Dosing Control unit") 60 for controlling the injection module 30 and the pump module 40 to control the injection amount of the reducing agent to be injected from the reducing agent injection valve 31. The storage tank 50 and the pump module 40 are connected to each other through a first supply passage 57, the pump module 40 and the injection module 30 are connected to each other through a second supply passage 58, and the injection module 30 and the storage tank 50 are connected to each other through a circulation passage 59.

In the example of the exhaust gas purification system 10 shown in FIG. 1, DCU 60 is connected to CAN 65. CAN 65 is connected to a control unit (hereinafter referred to as "ECU: Engine Control Unit" in some cases) 70 for controlling the operation state of the internal combustion engine. Not only information concerning the operation state of the internal combustion engine such as a fuel injection amount, an injection timing, a rotational number, etc. are written in CAN 65, but also information of all sensors, etc. provided to the exhaust gas purification system 10 are written in CAN 65. In CAN 65, it can be determined whether an input signal value is within a standard range or not in CAN 65. DCU 60 connected to CAN 65 can read information on CAN 65, and also output information onto CAN 65.

In this embodiment, ECU 70 and DCU 60 comprise separate control units, and can communicate information with each other through CAN 65. However, ECU 70 and DCU 60 may be constructed as a single control unit.

The storage tank 50 is provided with a temperature sensor 51 for detecting the temperature of reducing agent in the tank, a level sensor 55 for detecting the residual amount of reducing agent and a quality sensor 53 for detecting quality such as viscosity, concentration, etc. of reducing agent. Values detected by these sensors are output as signals and written onto CAN 65. Well-know parts may be properly used as these sensors.

Urea water solution, hydro carbon (HC) is mainly used as the reducing agent to be stocked, and the exhaust gas purification system of this embodiment is constructed to use urea water solution.

The pump module 40 has a pump 41, a pressure sensor 43 as pressure detecting means for detecting the pressure in the second supply passage 58 at the downstream of the pump 41 (hereinafter referred to as "pressure of reducing agent" in some cases), a temperature sensor 45 for detecting the temperature of reducing agent to be pressure-fed, a foreign material collecting filter 47 disposed at some position of the second supply passage 58 at the downstream side of the pump 41, and a pressure control valve 49 for returning a part of the reducing agent from the downstream side of the pump 41 to the upstream side of the pump 41 to reduce the pressure when the pressure of the reducing agent at the downstream side of the pump 41 exceeds a predetermined value.

The pump 41 comprises an electrically-operated pump, for example, and it is driven on the basis of a signal transmitted from DCU 60. Well-known sensors may be arbitrarily used as the pressure sensor 43 and the temperature sensor 45. Values detected by these sensors are output as signals, and written onto CAN 65. Furthermore, a well-known check valve or the like may be used as the pressure control valve 49.

The injection module 30 has a pressure chamber 33 in which reducing agent pressure-fed from the pump module 40 side is stocked, a reducing agent injection valve 31 connected to the pressure chamber 33, an orifice 35 disposed at some position of a passage extending from the pressure chamber 33 and intercommunicating with the circulation passage 59, and a temperature sensor 37 disposed just before the orifice 35.

The reducing agent injection valve 31 comprises an ON-OFF valve for controlling ON-OFF of valve opening through duty control, for example. Furthermore, in the pressure chamber 33, the reducing agent pressure-fed from the pump module 40 is stocked under a predetermined pressure, and the reducing agent is injected into the exhaust gas passage 11 when the reducing agent injection valve 31 is opened on the basis of a control signal transmitted from DCU 60. The orifice 35 is disposed in the passage at the downstream side of the pressure chamber 33, so that the internal pressure of the pressure chamber 33, and the second supply passage 58 at the upstream side of the orifice 35 is not lowered easily, and thus the output of the pump module 40 can be suppressed to a low value. As not shown, a valve for performing circulation control of reducing agent may be provided at some position of the circulation passage 59 in place of arranging the orifice 35.

Furthermore, the circulation passage 59 disposed between the injection module 30 and the storage tank 50 is provided so that reducing agent other than reducing agent injected from the reducing agent injection valve 31 of the injection module 30 is made to reflow into the storage tank 50 out of reducing agent pressure-fed from the pump module 40 in order to prevent the reducing agent from being affected by exhaust gas heat or the like and exposed to high temperature.

DCU 60 performs the operation control of the reducing agent injection valve 31 on the basis of various information existing on CAN 65 so that a proper amount of reducing agent is injected into the exhaust gas passage 11. Furthermore, DCU 60 in the embodiment of the present invention has a function as a trouble diagnosis device for an $NO_x$ sensor 17 (hereinafter referred to as "trouble diagnosis device").

DCU 60 mainly comprises a microcomputer having a well-known construction, and in FIG. 1, constructions represented by functional blocks are shown with respect to parts concerning the operation control of the reducing agent injection valve 31, the driving control of the pump 41 and the trouble diagnosis of the exhaust gas purification system 10.

That is, DCU 60 in the embodiment of the present invention comprises, as main constituent elements, a CAN information taking and generating unit (represented as "CAN information take-out and generation" in FIG. 1), a trouble diagnosis unit of the $NO_x$ sensor 17 (represented as "$NO_x$ sensor trouble diagnosis" in FIG. 1), a pump driving control unit (represented as "pump driving control" in FIG. 1), a reducing agent injection valve operation controller (represented as "Udv operation control" in FIG. 1), etc. Specifically, these parts are implemented by executing programs through the microcomputer (not shown).

The CAN information taking and generating unit reads information concerning the driving state of the engine output from ECU 70, sensor information output from the $NO_x$ sensor 17 and information existing on CAN 65, and outputs these information onto the respective parts.

Furthermore, the pump driving controller continually reads information concerning the pressure of reducing agent in the second supply passage 58 which is output from the CAN information taking and generating unit, and executes feedback control on the pump 41 on the basis of the pressure information, so that the pressure of the reducing agent in the second supply passage 58 and the pressure chamber 33 is kept to a substantially fixed state. For example, in the case where the pump 41 is an electrically-operated pump, when the output pressure value is lower than a target value, the pump 41 is controlled so that the duty ratio of the electrically-operated pump is increased to increase the pressure. Conversely, when the output pressure value exceeds the target value, the pump 41 is controlled so that the duty ratio of the electrically-operated pump is reduced to lower the pressure.

The reducing agent injection valve operation controller reads the information concerning the reducing agent in the storage tank 50, the information concerning the exhaust gas temperature, the $NO_x$ catalyst temperature and the $NO_x$ concentration at the downstream side of the $NO_x$ catalyst, the information concerning the operation state of the engine, etc. which are output from the CAN information taking and generating unit, generates a control signal for injecting from the reducing agent injection valve 31 reducing agent whose amount is required to reduce $NO_x$ contained in exhaust gas, and outputs the control signal to a reducing agent injection valve operation device (represented by "Udv operation device" in FIG. 1) 67 for operating the reducing agent injection valve 31.

Purification of exhaust gas by the exhaust gas purification system 10 constructed as shown in FIG. 1 is carried out as follows.

Under the operation of the internal combustion engine, the reducing agent in the storage tank 50 is pumped up by the pump 41, and pressure-fed to the injection module 30 side. At this timer the detection value of the pressure sensor 45 at the downstream side of the pump 41 provided to the pump module 40 is fed back. When the detection value is less than a predetermined value, the output of the pump 41 is increased. When the pressure value exceeds a predetermined value, the pressure is reduced by the pressure control valve 49. Accordingly, the pressure of the reducing agent pressure-fed to the injection module 30 side is controlled to be kept to a substantially fixed value.

Furthermore, the reducing agent pressure-fed from the pump module 40 to the injection module 30 flows into the pressure chamber 33 of the reducing agent and it is kept to substantially fixed pressure, whereby the reducing agent is injected into the exhaust gas passage 11 at all times when the reducing agent injection valve 31 is opened. Furthermore, the reducing agent reflows through the circulation passage 59 into the storage tank 50. Therefore, the reducing agent which is not injected into the exhaust gas passage 11 is stocked in the pressure chamber 33, and thus it is prevented from being exposed to high temperature with exhaust gas heat.

Under the state that the reducing agent is stocked in the pressure chamber 33 under a substantially fixed pressure value, DCU 60 determines the amount of reducing agent to be injected on the basis of information such as the operation state and exhaust gas temperature of the internal combustion engine, the temperature of the $NO_x$ catalyst 13 and the amount of $NO_x$ which is passed through the $NO_x$ catalyst 13 without being reduced and measured at the downstream side of the $NO_x$ catalyst 13, etc., generates the control signal corresponding to the determined reducing agent amount and outputs the control signal to the reducing agent injection valve control device 67. The duty control of the reducing agent injection valve 31 is performed by the reducing agent injection valve operation device 67, and a proper amount of reducing agent is injected into the exhaust gas passage 11. The reducing agent injected into the exhaust gas passage 11 flows into the $NO_x$ catalyst 13 while mixed in the exhaust gas, and used for the reductive reaction of $NO_x$ contained in the exhaust gas, whereby the purification of the exhaust gas is performed.

In the exhaust gas purification system of this embodiment, the $NO_x$ sensor as a diagnosis target of the trouble diagnosis device described later is disposed at the downstream side of the $NO_x$ catalyst. However, the diagnosis target is not limited to the $NO_x$ sensor disposed at this position, and it may be an $NO_x$ sensor disposed at the upstream side of the $NO_x$ catalyst.

(2) Trouble Diagnosis Device

Here, DCU 60 of the embodiment according to the present invention is provided with a trouble diagnosis unit for the $NO_x$ sensor 17. The trouble diagnosis unit for the $NO_x$ sensor 17 is configured so as to determine whether the $NO_x$ sensor 17 accurately responds in a normal operation mode without forcedly creating a diagnosis mode.

Figure 2:
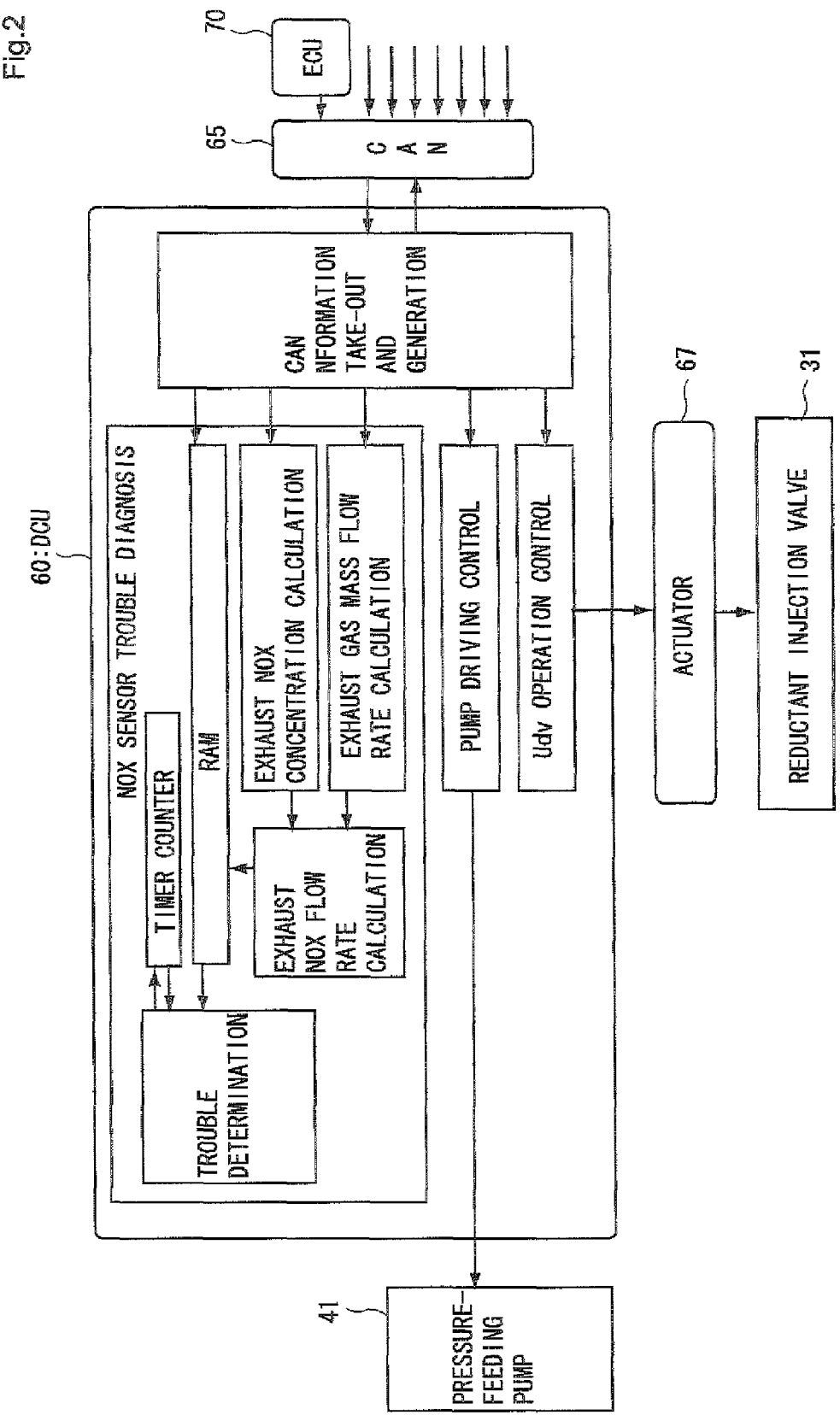
FIG. 2 is a block diagram showing an example of the construction of a trouble diagnosis device for an $NO_x$ sensor.

As shown in FIG. 2, the trouble diagnosis unit for the $NO_x$ sensor 17 contains exhaust gas mass flow rate calculating means for calculating the mass flow rate of exhaust gas (represented as "exhaust gas flow rate calculation" in FIG. 2), exhaust $NO_x$ concentration calculating means for calculating the $NO_x$ concentration at the upstream side of the $NO_x$ catalyst (represented as "exhaust $NO_x$ concentration calculation" in FIG. 2), exhaust $NO_x$ flow rate calculating means for calculating the $NO_x$ flow rate at the upstream side of the $NO_x$ catalyst per unit time (represented as "exhaust $NO_x$ flow rate calculation" in FIG. 2), RAM (Random Access Memory) for storing the calculated exhaust $NO_x$ flow rate and the $NO_x$ concentration detected by the $NO_x$ sensor, and trouble determining means for determining by using a predetermined reference pattern and a follow pattern whether the detected $NO_x$ concentration undergoes a transition while following variation of the exhaust $NO_x$ flow rate, thereby determining the responsiveness of the $NO_x$ sensor (represented as "trouble determination" in FIG. 2).

The exhaust gas mass flow rate calculating means reads information concerning the operation state of the internal combustion engine which is output from the CAN information taking and generating unit, and calculates the flow rate of the exhaust gas discharged from the internal combustion engine.

Furthermore, as in the case of the exhaust gas mass flow rate calculating means, the exhaust $NO_x$ concentration calculating means reads information concerning the operation state of the internal combustion state which is output from the CAN information taking and generating unit, and calculates the $NO_x$ concentration exhausted from the internal combustion engine.

The information concerning the operation state of the internal combustion engine which exists on CAN and is used to calculate the exhaust gas mass flow rate and calculate the $NO_x$ concentration exhausted from the internal combustion engine contains a fuel injection amount, a rotational number, the status of an exhaust gas circulating device (hereinafter referred to as "EGR: Exhaust Gas Recirculation"), an exhaust circulation amount, an air suction amount, a cooling water temperature, etc. The exhaust gas mass flow rate and the exhaust $NO_x$ concentration can be calculated on the basis of these information by a well-known method.

The exhaust $NO_x$ flow rate calculating means calculates the exhaust $NO_x$ flow amount exhausted from the internal combustion engine per unit time on the basis of the $N_x$ concentration calculated by the exhaust $NO_x$ concentration calculating means and the mass flow rate of the exhaust gas calculated by the exhaust gas mass flow rate calculating means.

RAM stores the exhaust $NO_x$ flow amount per unit time which is output from the exhaust $NO_x$ flow rate calculating means and the detected $NO_x$ concentration of the $NO_x$ sensor which is output from the CAN information taking and generating unit, and outputs these information to the trouble determining means described later for use of the trouble determination.

The trouble determining means reads the exhaust $NO_x$ flow rate and the detected $NO_x$ concentration stored in RAM, and determines whether the detected $NO_x$ concentration undergoes a transition while having a predetermined relation with a follow pattern which is defined in advance when the exhaust $NO_x$ flow rate undergoes a transition while having a predetermined relation with a reference pattern which is defined in advance, thereby determining the responsiveness of the $NO_x$ sensor. That is, in order to perform a trouble diagnosis for the $NO_x$ sensor, the trouble diagnosis device of this invention does not forcedly increase the exhaust $NO_x$ flow amount to create a diagnosis mode, but detects the time-lapse variation of the exhaust $NO_x$ flow rate suitable for diagnosis in a normal operation mode and determines whether the $NO_x$ sensor responds with following this variation. Accordingly, there is not provided any control means having a function of controlling the operation state so that the exhaust $NO_x$ concentration of the internal combustion engine is increased to perform the trouble diagnosis of the $NO_x$ sensor. The trouble determining means is shifted to a determination mode when the exhaust $NO_x$ flow rate to be compared by the exhaust $NO_x$ flow rate transition comparing means is set to satisfy a predetermined condition with respect to the reference pattern.

Furthermore, the trouble determining means of this embodiment also has a function of determining that the $NO_x$ sensor is firmly fixed due to soot or the like in the exhaust gas when there appears no variation following the detected $NO_x$ concentration although a predetermined time elapses from transit variation of the exhaust $NO_x$ flow rate.

Furthermore, the trouble diagnosis unit of this embodiment is provided with a timer counter for counting the time when the trouble diagnosis is performed.

(3) Timing Chart

Next, it will be described with a timing chart shown in FIG. 3 to check it by using a predetermined reference pattern and a follow pattern in the trouble diagnosis device of this embodiment whether the detected $NO_x$ concentration varies while following the transit variation of the exhaust $NO_x$ flow rate and determine the responsiveness of the $NO_x$ sensor.

Figure 3:
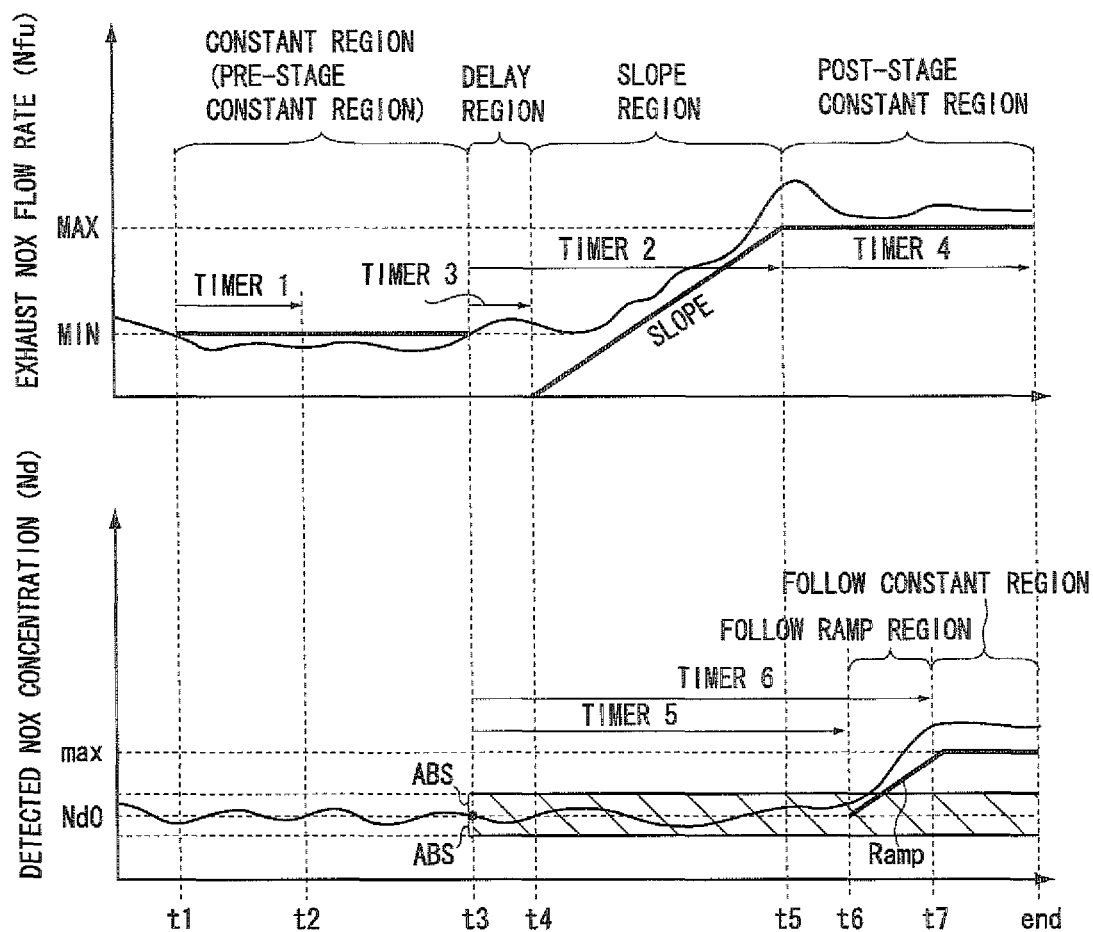
FIG. 3 is a timing chart showing a trouble diagnosis based on time-lapse variation of an exhaust $NO_x$ flow rate and a detected $NO_x$ concentration.

In the timing chart of FIG. 3, the reference pattern contains a constant region (pre-stage constant region), a slope region and a post-stage constant region. The reference pattern contains a delay region in which the start position of the slope region is delayed by a timer 3. Furthermore, the follow pattern contains a follow ramp region and a follow post-stage constant region.

First, the exhaust $NO_x$ flow rate Nfu which is continually stored in RAM and the detected $NO_x$ concentration Nd are continually read out, and a timer 1 is actuated at a time point of t1 at which the value of the exhaust $NO_x$ flow rate Nfu dips from the reference value MIN of the constant region of the reference pattern. The processing is set to a standby state from a time point of t2 at which the timer 1 is finished under the state that the exhaust $NO_x$ flow rate Nfu is lower than the reference value MIN, and it continues to be on standby until the exhaust $NO_x$ flow rate Nfu exceeds the reference value MIN.

At this time, another timer may be actuated simultaneously with the timer 1 to determine the maximum time of the standby state, and the diagnosis may be finished when the exhaust $NO_x$ flow rate Nfu does not exceed the reference value MIN until a predetermined time elapses. In this case, it can be avoided that an unstable state that a diagnosis program does not operate is continued for a long time.

Thereafter, a timer 2, a timer 3, a timer 5 and a timer 6 are actuated at a time point of t3 at which the exhaust $NO_x$ flow rate Nfu exceeds the reference value MIN, and also the value of the detected $NO_x$ concentration at the time point of t3 is stored as $Nd_0$. That is, at t3, the trouble determining means is shifted to the determination mode, and also the start position of the follow ramp region of the follow pattern is set to $Nd_0$.

In the example of FIG. 3, the comparison between the value of the exhaust $NO_x$ flow rate Nfu and the value of the reference pattern is not performed during the time period from t3 till a time point of t4 at which the timer 3 is finished, and the time point of t4 is set to the start position of the slope region of the reference pattern. By providing the delay region as described above, the trouble diagnosis is continued without being interrupted even when the exhaust $NO_x$ flow rate Nfu temporarily dips from the reference value MIN after the time t3 of the shift to the determination mode.

With respect to the exhaust $NO_x$ flow rate Nfu, during the time period from the time point of t4 till t5 at which the timer 2 is finished, it is determined whether the value Nfu of the exhaust $NO_x$ flow rate is larger than the value SLOPE of the slope region, and during time period from t5 till the time when the timer 4 is finished, it is determined whether the value Nfu of the exhaust $NO_x$ flow rate is larger than the value MAX of the post-stage constant region. That is, when the exhaust $NO_x$ flow rate Nfu undergoes a transition while exceeding the value SLOPE of the slope region and the value MAX of the post-stage constant region, it can be known that there was a variation of the exhaust $NO_x$ flow rate Nfu suitable for the trouble diagnosis of the $NO_x$ sensor in the operation mode without forcedly creating the diagnosis mode. Furthermore, subsequently to t3, when the value Nfu of the exhaust $NO_x$ flow rate is lower than the value SLOPE or the value MAX of the reference pattern at some time point, it is determined that the trouble diagnosis of the $NO_x$ sensor cannot be accurately performed, and thus the determination mode of the trouble determining means is reset.

With respect to the detected $NO_x$ concentration Nd, subsequently to the time point of t3, when the timer 5 actuated at t3 is finished at the time point of t6, it is determined whether the detected $NO_x$ concentration Nd is larger than the value Ramp of the follow ramp region and the value max of the follow post-stage constant region until the time when the timer 4 is finished. If the detected $NO_x$ concentration Nd indicates a value larger than the value Ramp of the follow ramp region and the value max of the follow post-stage constant region until the timer 4 is finished after the timer 5 is finished, it is determined that the $NO_x$ sensor responds while following the transit variation of the exhaust $NO_x$ flow rate Nfu. On the other hand, if the detected $NO_x$ concentration Nd is lower than the value Ramp of the follow ramp region and the value max of the follow post-stage constant region until the timer 4 is finished after the timer 5 is finished, it is determined that some abnormality occurs in the responsiveness of the $NO_x$ sensor.

Furthermore, at the same time, the timer 6 is actuated at the time point of t3, and when the detected $NO_x$ concentration Nd does not vary from the start value $Nd_0$ as a criteria by a stipulated value ABS or more until t7 at which the timer 6 is finished, it is determined that the $NO_x$ sensor is firmly fixed due to soot or the like in the exhaust gas. The value of the stipulated value ABS is set as a criteria to determine the fixing of the $N_x$ sensor.

2. Trouble Diagnosis Method

Figure 5:
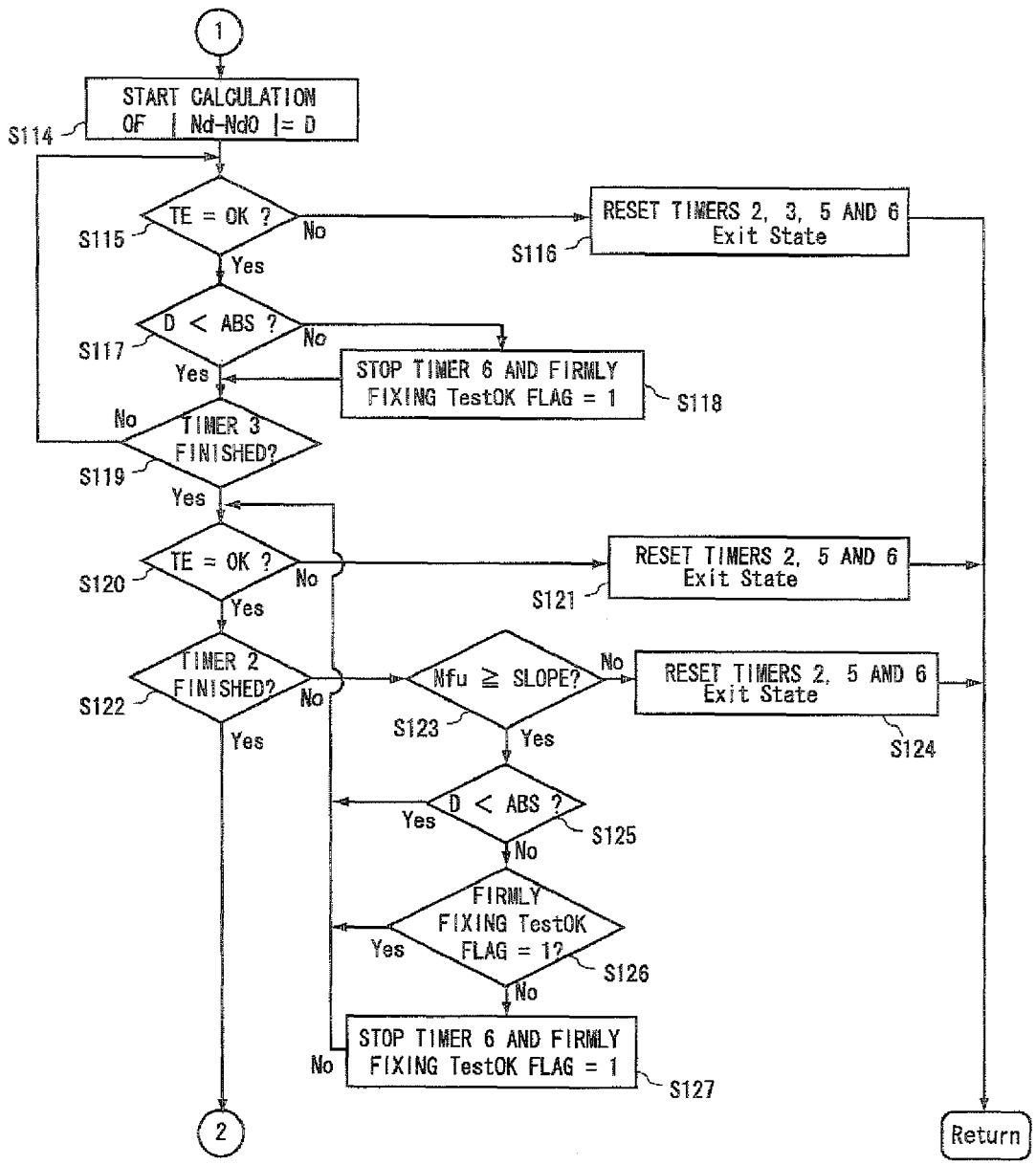
FIG. 5 is a flowchart (part 2) showing an example of the $NO_x$ sensor trouble diagnosis method according to the first embodiment.
Figure 6:
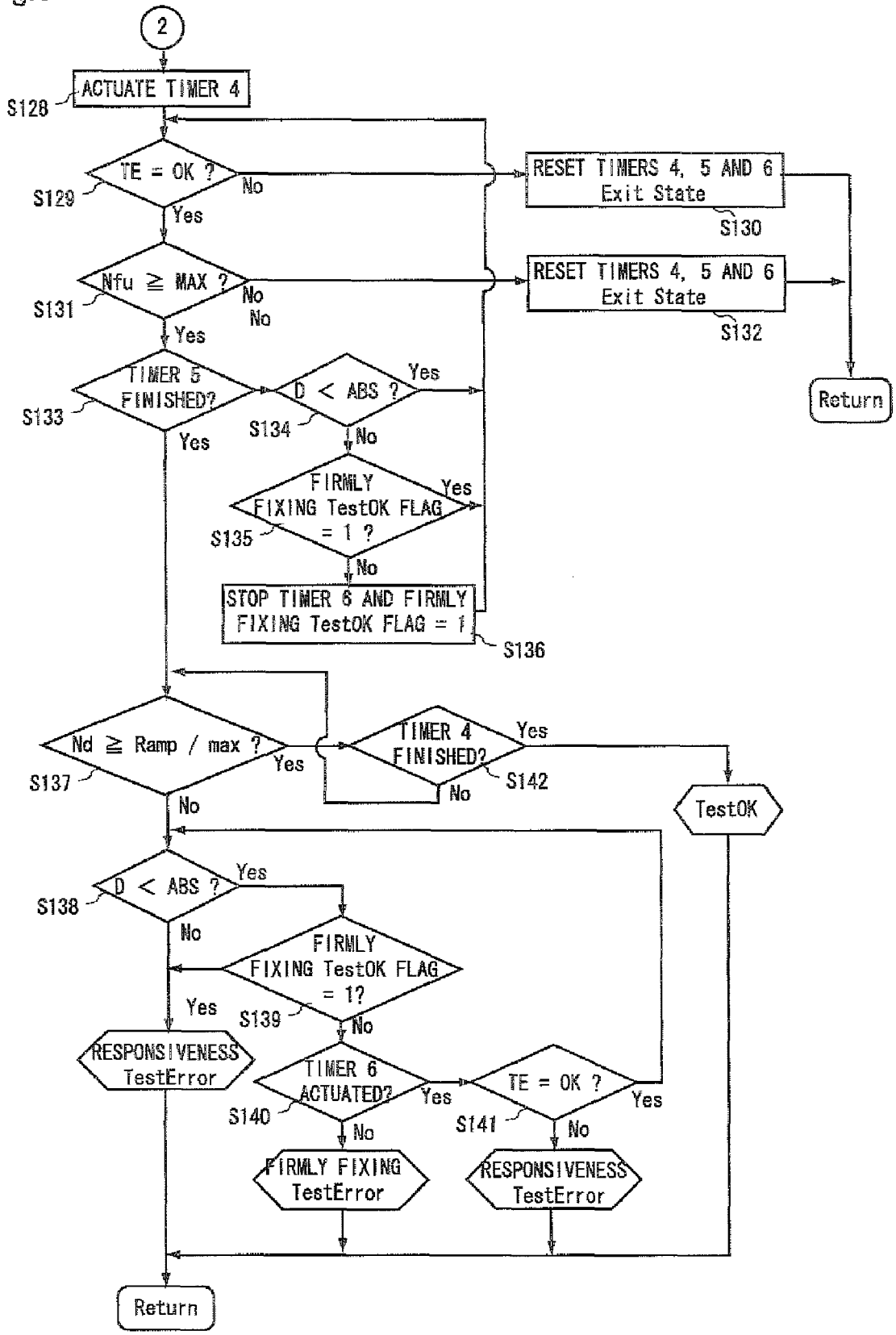
FIG. 6 is a flowchart (part 3) showing an example of the $NO_x$ sensor trouble diagnosis method according to the first embodiment.

Next, an example of the specific routine of the trouble diagnosis method for the $NO_x$ sensor will be described with reference to the flowcharts of FIGS. 4 to 6. This routine may be executed at all times, or may be executed by interruption every constant time.

First, after the start, it is determined in step S100 whether there is no error information from the $NO_x$ sensor provided at the downstream side of the $NO_x$ catalyst and also an input value from the $NO_x$ sensor is within a standard range of CAN. When these conditions are not satisfied, the processing is returned to the start position. When all the conditions are satisfied, the processing goes to step S101.

In step S101, a detection signal Ns from the $NO_x$ sensor is recognized, and then it is determined in step S102 in combination with the condition determined in step S100 whether the engine speed is equal to or more than a stipulated value and also an exhaust brake is set to OFF (hereinafter referred to as "test environment condition (TE)"). When these conditions are not satisfied, the processing is returned to the start position. When all the conditions are satisfied, the processing goes to step S103.

In step S103, the exhaust $NO_x$ flow rate Nfu is read, and it is determined whether the exhaust $NO_x$ flow rate Nfu is less than the stipulated value MIN. When the exhaust $NO_x$ flow rate Nfu is equal to or more than the stipulated value MIN, the processing is returned to the start position. When the exhaust $NO_x$ flow rate Nfu is less than the stipulated value MIN, the processing goes to step S104.

In step S104 executed when the exhaust $NO_x$ flow rate Nfu is less than the stipulated value MIN, the timer 1 is actuated, and the processing goes to step S105. In step S105, it is determined whether the above test environment condition is satisfied. When the test environment condition is not satisfied, the timer 1 is reset in step S106, and then the processing is returned to the start position. When the test environment condition is satisfied, the processing goes to step S107.

In step S107, it is determined whether the exhaust $NO_x$ flow rate Nfu is less than the reference value MIN of the first constant region of the reference pattern. When the exhaust $NO_x$ flow rate Nfu is equal to or more than the value MIN, the timer 1 is reset in step S108, and then the processing is returned to the start position. On the other hand, when the exhaust $NO_x$ flow rate Nfu is less than the value MIN, the processing goes to step S109 to determine whether the timer 1 is finished. When the timer 1 is not finished, the processing is returned to step S105. On the other hand, when the timer 1 is finished, the processing goes to step S110.

In step S110 to which the processing goes when the time period of the timer 1 is finished under the state that the exhaust $NO_x$ flow rate Nfu is less than the value MIN, it is determined again whether the test environment condition is satisfied. When the test environment condition is not satisfied, the processing is returned to the start position. On the other hand, when the test environment condition is satisfied, the processing goes to step S111 to determine whether the exhaust $NO_x$ flow rate Nfu is equal to or more than the value MIN. When the exhaust $NO_x$ flow rate Nfu is less than the value MIN, the processing is returned to step S110. On the other hand, when the exhaust $NO_x$ flow rate Nfu is equal to or more than the value MIN, the processing goes to step S112 to store, as the start value $Nd_0$, the value Nd of the detected $NO_x$ concentration detected by the $NO_x$ sensor at this time point, and also goes to step S113 to actuate the timers 2, 3, 5 and 6.

Subsequently, in step S114, the calculation of the absolute value D of the difference between the value of the detected $NO_x$ concentration Nd of the $NO_x$ sensor and the stored start value $Nd_0$ is started. Subsequently, in step S115, it is determined whether the test environment condition is satisfied. When it is not satisfied, all the timers 2, 3, 5 and 6 are reset in step S116 and then the processing is returned to the start position. On the other hand, when the test environment condition is satisfied, it is determined whether the absolute value D calculated through the calculation of the step S117 is less than the stipulated value ABS. When the absolute value D is less than the stipulated value ABS, the processing directly goes to step S119, and when the absolute value D is equal to or more than the stipulated value ABS, the timer 6 is stopped in step S118, and the processing goes to step S119 after the firm fixing TestOK flag is erected.

Subsequently, it is determined in step S119 whether the timer 3 is finished or not. When the timer 3 is finished, the processing is returned to step S115. When the timer 3 is finished, the processing goes to step S120. In step S120, it is determined whether the test environment condition is satisfied or not. When it is not satisfied, the timers 2, 5 and 6 are reset in step S121, and then the processing is returned to the start position. On the other hand, when the test environment condition is satisfied, the processing goes to step S122 to determine whether the timer 2 is finished or not. When the timer 2 is not finished, it is determined in step S123 whether the exhaust $NO_x$ flow rate Nfu is equal to or more than the value SLOPE of the slope region of the reference pattern. When the exhaust $NO_x$ flow rate Nfu is less than SLOPE, the processing goes to step S124 to reset the timers 2, 5 and 6, and then the processing is returned to the start position.

On the other hand, when the exhaust $NO_x$ flow rate Nfu is equal to or more than the value SLOPE, the processing goes to step S125, and it is determined whether the absolute value D of the difference between the detected $NO_x$ concentration Nd and the start value $Nd_0$ is less than the stipulated value ABS. When the absolute value D is less than the stipulated value ABS, the processing is directly returned to step S120. On the other hand, when the absolute value D is equal to or more than the stipulated value ABS, it is determined in step S126 whether the firmly fixing TestOK flag is put up. When the firmly fixing TestOK flag is put up, the processing is directly returned to step S120. On the other hand, when the firmly fixing TestOK flag is not put up, the timer 6 is stopped and also the firmly fixing TestOK flag is put up in step S127, and then the processing is returned to step S120.

When the timer 2 is finished in step S122, the timer 4 is actuated in step S128, and it is determined in step S129 whether the test environment condition is satisfied. When the test environment condition is not satisfied, the timers 4, 5 and 6 are reset in step S130, and then the processing is returned to the start position. On the other hand, when the test environment condition is satisfied, the processing goes to step S131 to determine whether the exhaust $NO_x$ flow rate Nfu is equal to or more than the value MAX of the post-stage constant region of the reference pattern. When the exhaust $NO_x$ flow rate Nfu is less than the value MAX, the timers 4, 5 and 6 are reset in step S132, and then the processing is returned to the start position. On the other hand, when the exhaust $NO_x$ flow rate Nfu is equal to or more than the value MAX, the processing goes to step S133 to determine whether the timer 5 is finished. When the timer 5 is not finished, the processing goes to step S134 to determine whether the absolute value D is less than the stipulated value ABS.

In step S134, when the absolute value D is less than the stipulated value ABS, the processing is directly returned to step S129 as in the case of the step S125. On the other hand, when the absolute value D is equal to or more than the stipulated value ABS, it is determined in step S135 whether the firmly fixing TestOK flag is put up. When the firmly fixing TestOK flag is put up, the processing is directly returned to step S129. On the other hand, when the firmly fixing TestOK flag is not put up, the timer 6 is stopped in step S136, the firmly fixing TestOK flag is put up, and then the processing is returned to step S129.

On the other hand, when the timer 5 is finished in step S133, the processing goes to step S137 to determine whether the detected $NO_x$ concentration Nd is equal to or more than the value Ramp of the follow ramp region of the follow pattern or the value max of the follow post-stage constant region. When the detected $NO_x$ concentration Nd is less than the value Ramp or the value max, it is further determined in step S138 whether the absolute value D is less than the stipulated value ABS. When the absolute value D is equal to or more than the stipulated value ABS, responsiveness TestError is determined because it is determined that the $NO_x$ sensor is not firmly fixed, but the $NO_x$ sensor does not properly follow the variation of the exhaust $NO_x$ flow rate, and then the diagnosis is finished. On the other hand, when the absolute value D is less than the stipulated value ABS, the processing goes to step S139 to determine whether the firmly fixing TestOK flag is put up. When the firmly fixing TestOK flag is put up, responsiveness TestError is determined because it is determined that the $NO_x$ sensor is not firmly fixed, but it does not properly follow the variation of the exhaust $NO_x$ flow rate, and then the diagnosis is finished.

When the firmly fixing TestOK flag is not put up in step S139, it is determined in step S140 whether the timer 6 is finished or not. When the timer 6 is finished, firmly fixing TestError is determined because it is determined that the $NO_x$ sensor hardly responds although a predetermined time elapses, and then the diagnosis is finished. On the other hand, when the timer 6 is operated, the processing goes to step S141 to determine whether the test environment condition is satisfied or not. When it is satisfied, the processing is returned to step S138. On the other hand, when the test environment condition is not satisfied, it is determined that the $NO_x$ sensor gets out of the test environment condition under the state that the $NO_x$ sensor has not yet led to the determination of the firm fixing, and thus it is processed as responsiveness TestError. Then, the diagnosis is finished.

On the other hand, when the detected $NO_x$ concentration Nd is equal to or more than the value Ramp or the value max in step S137, the processing goes to step S142 to determine whether the timer 4 is finished or not. When the timer 4 is not finished, the processing is returned to step S137. On the other hand, when the timer 4 is finished, TestOK is determined because the $NO_x$ sensor is not firmly fixed, and it properly follows the variation of the exhaust $NO_x$ flow rate, and the diagnosis is finished.

In the example of the $NO_x$ sensor trouble diagnosis method according to the first embodiment described above, after the shift to the determination mode, the time elapsing until the start position of the follow ramp region of the follow pattern (the lapse time of the timer 5) is set to be longer than the time elapsing until the slope region of the reference pattern is finished (the lapse time of the timer 2). That is, the trouble diagnosis method for the $NO_x$ sensor in the SCR system in which the capacity of the $NO_x$ catalyst disposed in the exhaust gas passage is Large such as a large-size vehicle or the like has been described in this embodiment, and the time period from the time when the exhaust $NO_x$ flow rate increases to the time when the detected $NO_x$ flow rate detected by the $NO_x$ sensor disposed at the downstream side of the $NO_x$ catalyst follows the increase concerned is longer by the amount corresponding to the increase of the capacity of the $NO_x$ catalyst.

However, the setting of the lapse times of the timer 2 and the timer 5 may be arbitrarily set in accordance with the follow-up performance of the $NO_x$ sensor at the downstream side of the $NO_x$ catalyst, and a $NO_x$ sensor trouble diagnosis method in an SCR system in which the capacity of the $NO_x$ catalyst is relatively small will be described in a second embodiment.

Second Embodiment

Figure 7:
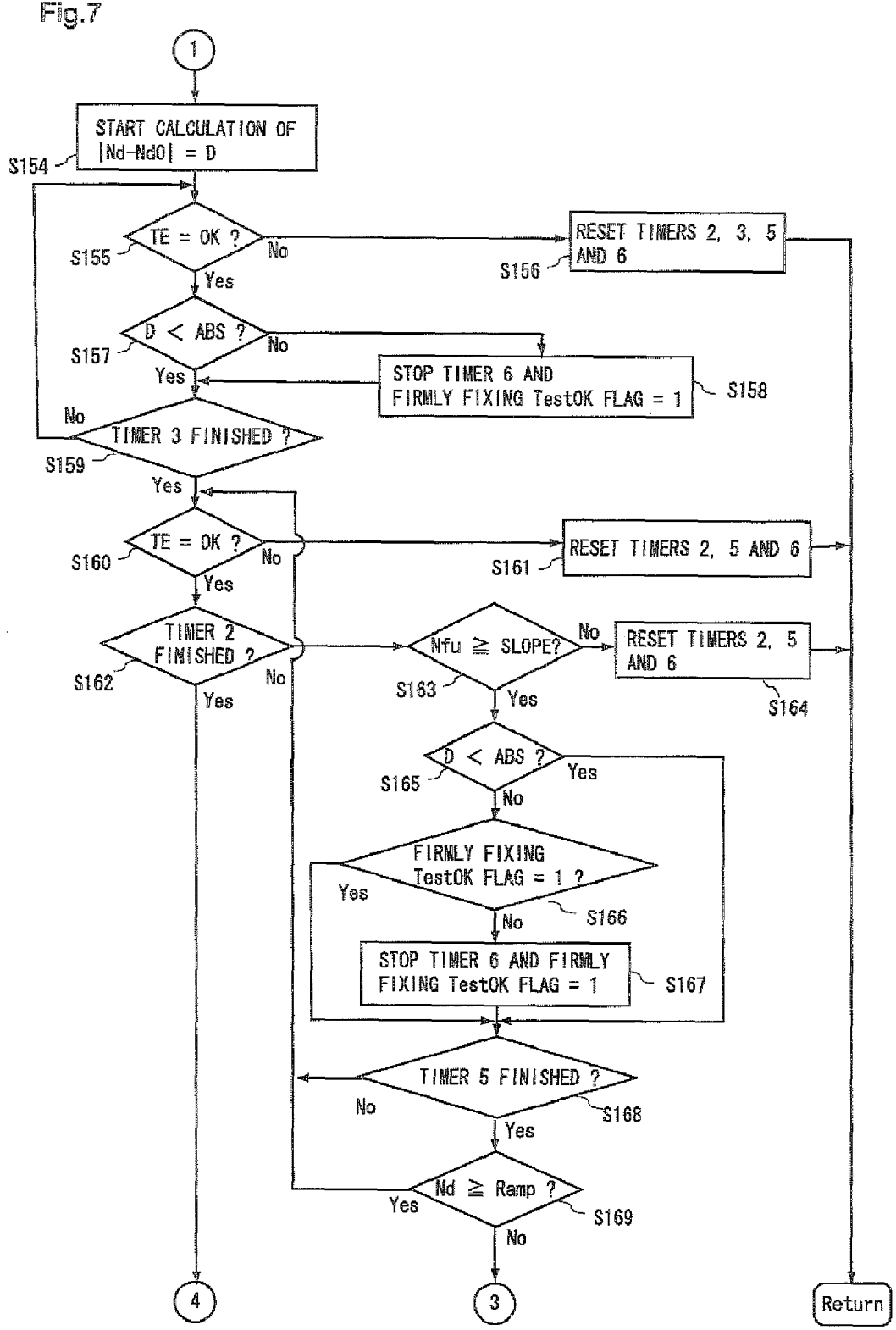
FIG. 7 is a flowchart (part 1) showing an example of the $NO_x$ sensor trouble diagnosis method according to a second embodiment.
Figure 8:
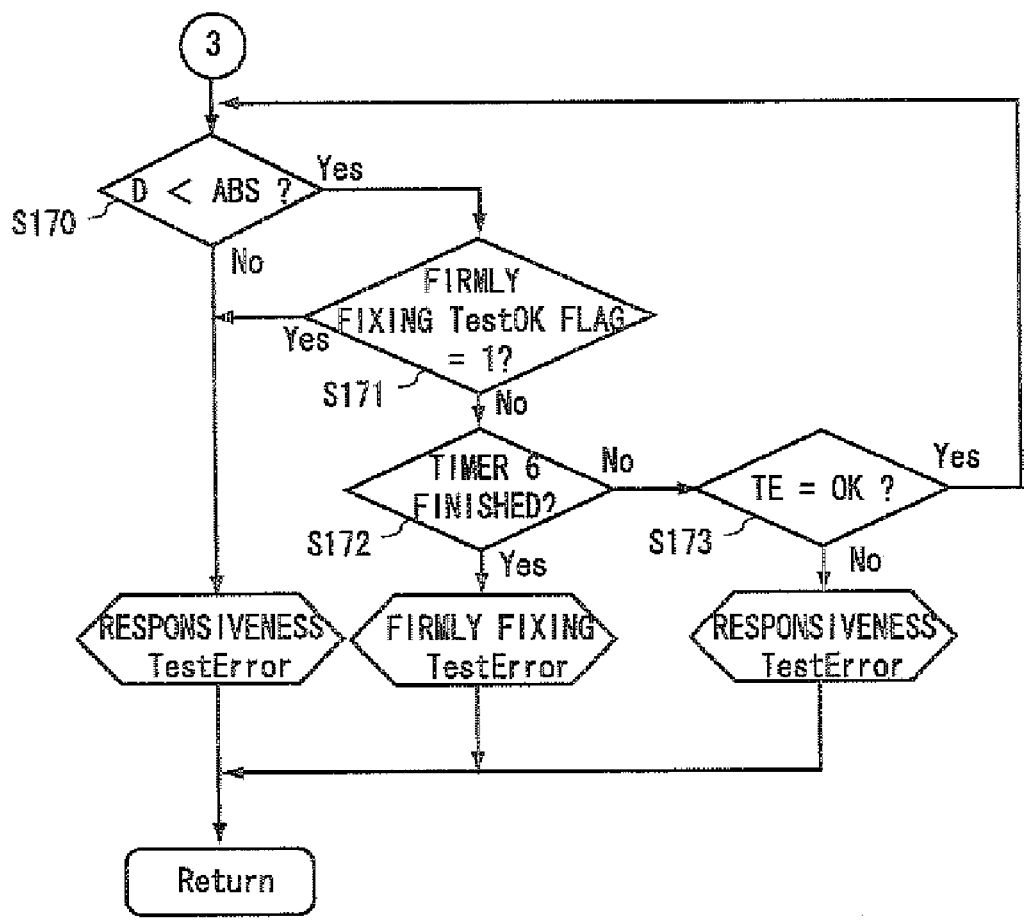
FIG. 8 is a flowchart (part 2) showing an example of the $NO_x$ sensor trouble diagnosis method according to the second embodiment.
Figure 9:
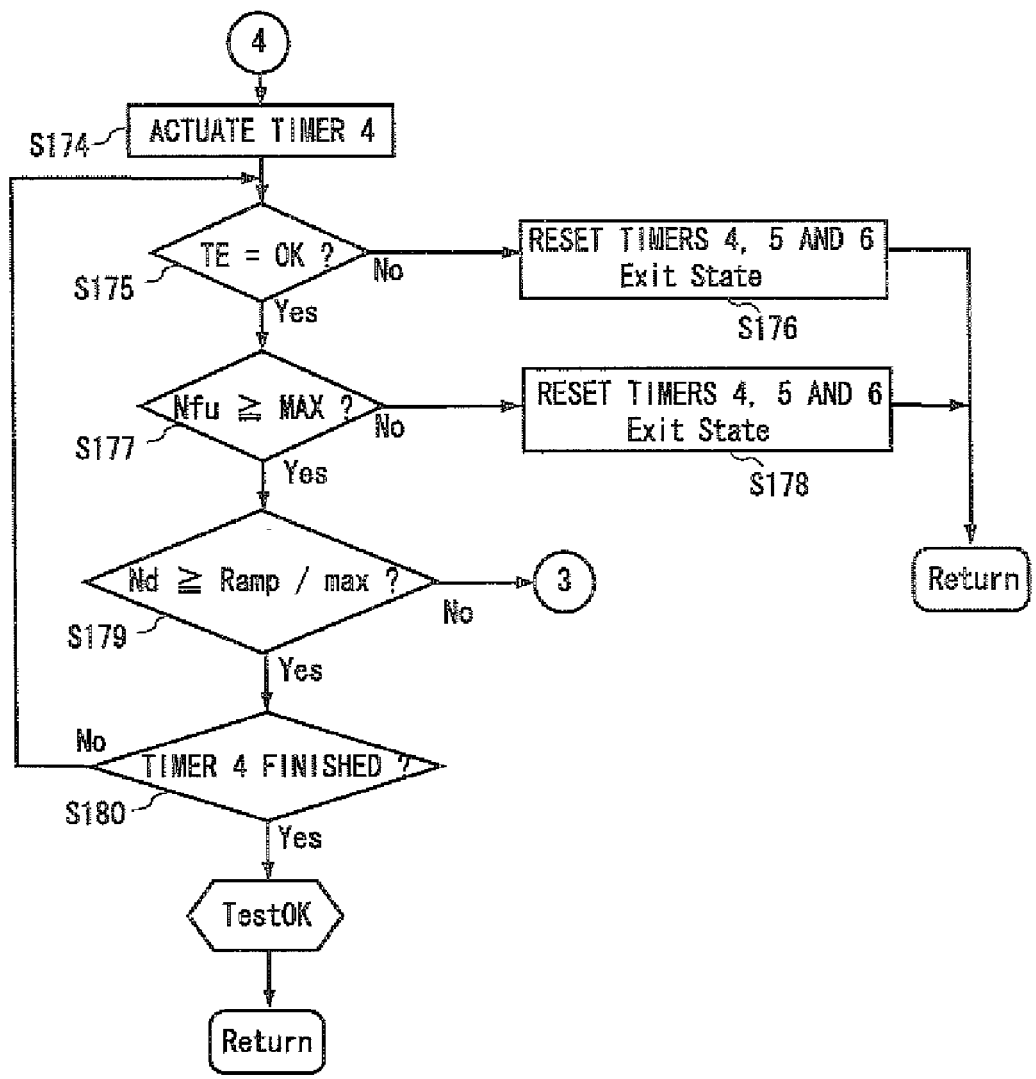
FIG. 9 is a flowchart (part 3) showing an example of the $NO_x$ sensor trouble diagnosis method according to the second embodiment.
Figure 10:
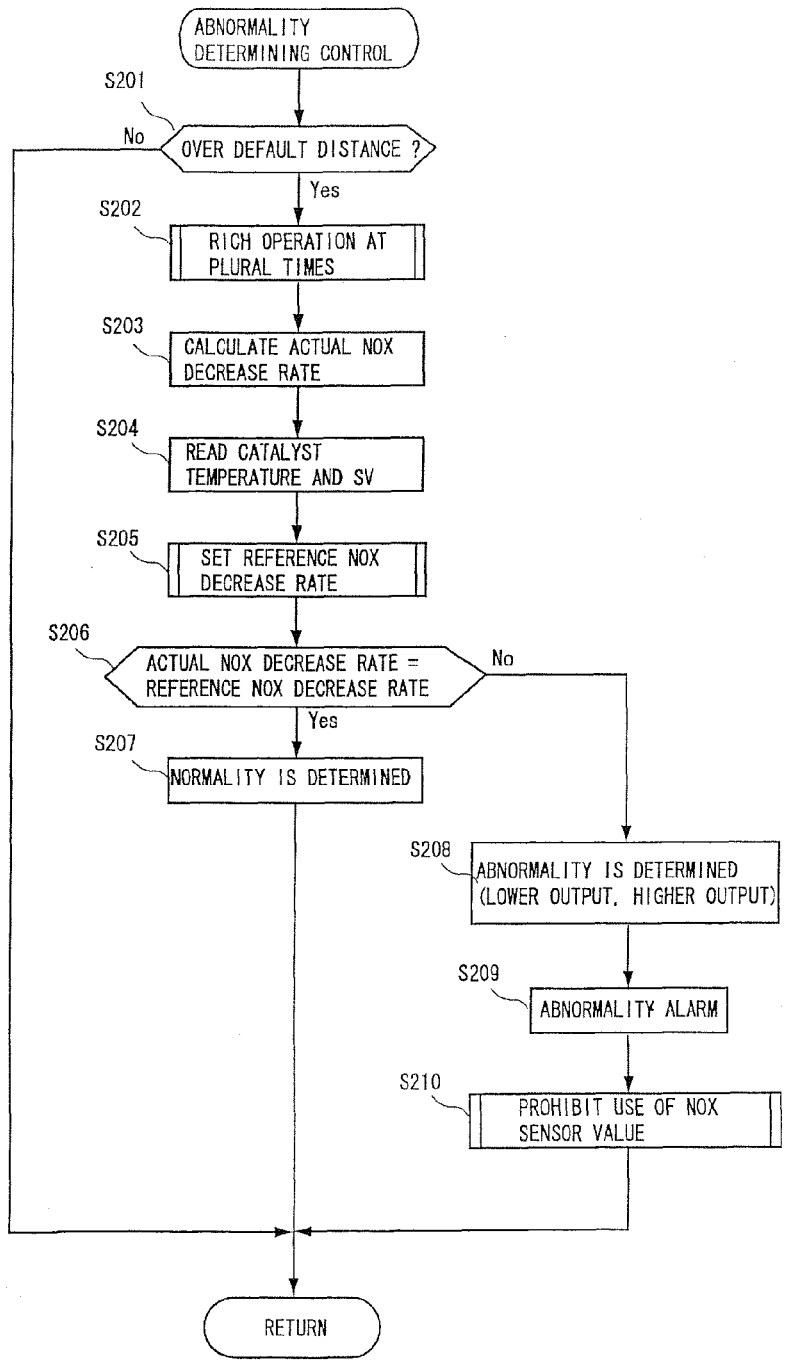
FIG. 10 is a diagram showing the flow of a conventional $NO_x$ sensor trouble diagnosis method.
Figure 11:
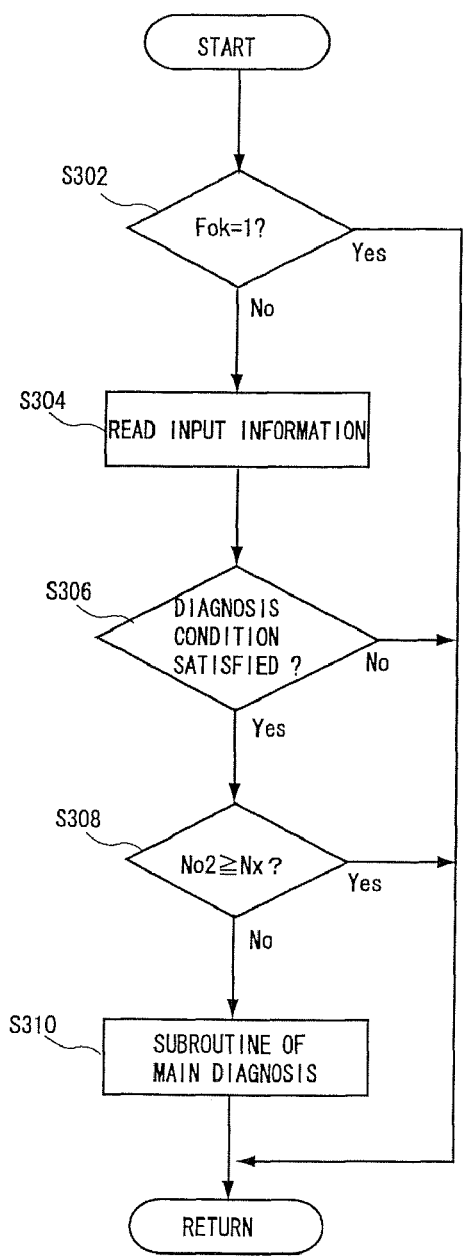
FIG. 11 is a diagram showing the flow of a conventional deterioration diagnosis method for a sensor.

The $NO_x$ sensor trouble diagnosis method according to this embodiment is an $NO_x$ sensor trouble diagnosis method in an SCR system in which the capacity of the $NO_x$ catalyst is relatively small as described above. That is, in this embodiment, the time period from the time when the exhaust $NO_x$ flow rate increases till the time when the detected $NO_x$ flow rate detected by the $NO_x$ sensor disposed at the downstream side of the $NO_x$ catalyst follows is short, and the lapse time of the timer 2 is set to be longer than the lapse time of the timer 5. Hereinafter, points different from those of the first embodiment will be mainly described along the flowcharts of FIGS. 7 to 9.

Figure 4:
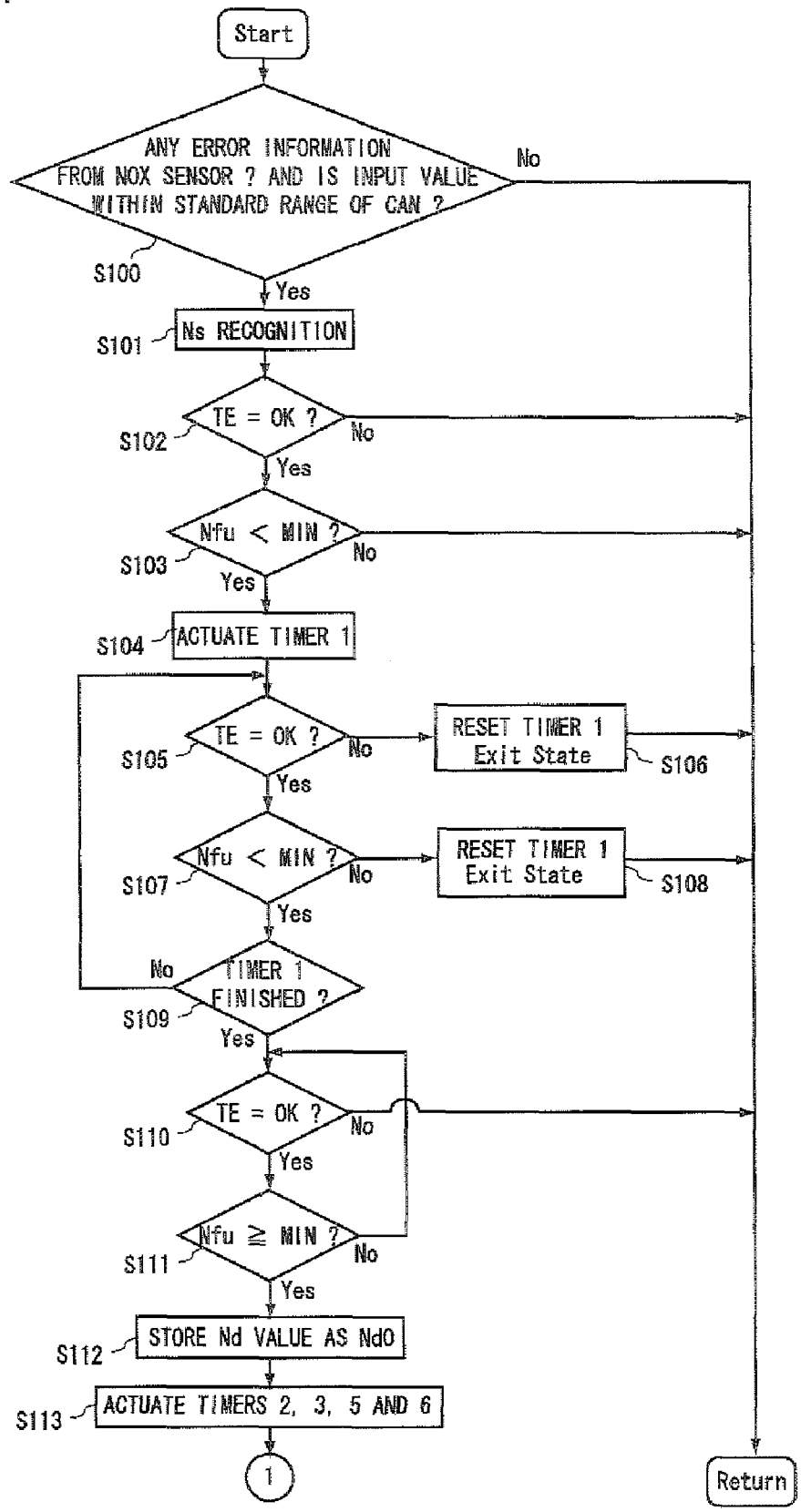
FIG. 4 is a flowchart (part 1) showing an example of a $NO_x$ sensor trouble diagnosis method according to the first embodiment.

In this embodiment, the same steps S100 to S113 as the first embodiment are executed until the timers 2, 3, 5 and 6 are actuated (see FIG. 4). After the timers 2, 3, 5 and 6 are actuated, steps S154 to S161 are executed as in the case of the steps S114 to S121 of the first embodiment (see FIG. 5), and then the processing goes to step S162.

In step S162, it is determined whether the timer 2 is finished. When the timer 2 is not finished, it is determined in step S163 whether the exhaust $NO_x$ flow rate Nfu is equal to or more than the value SLOPE of the slope region of the reference pattern. When the exhaust $NO_x$ flow rate Nfu is less than SLOPE, the processing goes to step S164 to reset the timers 2, 5 and 6, and then the processing is returned to the start position.

On the other hand, when the exhaust $NO_x$ flow rate Nfu is equal to or more than SLOPE, the processing goes to step S165 to determine whether the absolute value D of the difference between the detected $NO_x$ concentration Nd and the start value $Nd_0$ is less than the stipulated value ABS. When the absolute value D is less than the stipulated value ABS, the processing directly goes to step S168. On the other hand, when the absolute value D is equal to or more than the stipulated value ABS, it is determined in step S166 whether the firmly fixing TestOK flag is put up. When the firmly fixing TestOK flag is put up, the processing directly goes to step S168. On the other hand, when the firmly fixing TestOK flag is not put up, the timer 6 is stopped and the firmly fixing TestOK flag is put up in step S167, and then the processing goes to step S168.

In step S168, it is determined whether the timer 5 is finished. When the timer 5 is under operation, the processing is returned to step S160. When the timer 5 is finished, the processing goes to step S169. In the step S169 to which the processing goes when the timer 5 is determined to be finished, it is determined whether the detected $NO_x$ concentration Nd is equal to or more than the value Ramp of the follow ramp region of the follow pattern. When the value Nd of the detected $NO_x$ concentration is equal to or more than the value Ramp, the processing is returned to step S160. On the other hand, when the detected $NO_x$ concentration Nd is less than the value Ramp, it is determined in step S170 whether the absolute value D is less than the stipulated value ABS. When the absolute value D is equal to or more than the stipulated value ABS, the responsiveness TestError is determined because it is determined that the $NO_x$ sensor is not firmly fixed, but it does not properly follow the variation of the exhaust $NO_x$ flow rate, and then the diagnosis is finished. On the other hand, when the absolute value D is less than the stipulated value ABS, the processing goes to step S171 to determine whether the firmly fixing TestOK flag is put up. When the firmly fixing TestOK flag is put up, the responsiveness TestError is determined because it is determined that the $NO_x$ sensor is not firmly fixed, but it does not properly follow the variation of the exhaust $NO_x$ flow rate, and then the diagnosis is finished.

When the firmly fixing TestOK flag is not put up in step S171, it is determined in step S172 whether the timer 6 is finished. When the timer 6 is finished, the firmly fixing TestError is determined because it is determined that the $NO_x$ sensor hardly responds although a predetermined time elapses, and thus the diagnosis is finished. On the other hand, when the timer 6 operates, the processing goes to step S173 to determine whether the test environment condition is satisfied. When it is satisfied, the processing is returned to step S170. When it is not satisfied, it is processed as the responsiveness TestError because the $NO_x$ sensor gets out of the test environment condition under the state that it has not yet led to the determination of the firm fixing, and thus the diagnosis is finished.

When the timer 2 is finished in step S162, the timer 4 is actuated in step S174, and also it is determined in step S175 whether the test environment condition is satisfied. When the test environment condition is not satisfied, the timers 4, 5 and 6 are reset in step S176, and then the processing is returned to the start position. On the other hand, when the test environment condition is satisfied, the processing goes to step S177 to determine whether the exhaust $NO_x$ flow rate Nfu is equal to or more than the value MAX of the post-stage constant region of the reference pattern. When the exhaust $NO_x$ flow rate Nfu is less than the value MAX, the timers 4, 5 and 6 are reset in step S178, and the processing is returned to the start position. On the other hand, when the exhaust $NO_x$ flow rate Nfu is equal to or more than the value MAX, the processing goes to step S179 to determine whether the detected $NO_x$ concentration Nd is equal to or more than the value Ramp of the follow ramp region of the follow pattern or the value max of the follow post-stage constant region of the follow pattern. When the detected $NO_x$ concentration Nd is equal to or more than the value Ramp or the value max, the processing goes to step S180 to determine whether the timer 4 is finished. When the timer 4 is not finished, the processing is returned to step S175. On the other hand, when the timer 4 is not finished, TestOK is determined because it is determined that the $NO_x$ sensor is not firmly fixed and it properly follows the variation of the exhaust $NO_x$ flow rate.

On the other hand, when the detected $NO_x$ concentration Nd is less than the value Ramp or the value max in step S179, the processing goes to step S170 as in the case described above, and it is determined whether the absolute value D is less than the stipulated value ABS. When the absolute value D is equal to or more than the stipulated value ABS, the responsiveness TestError is determined because it is determined that the $NO_x$ sensor is not firmly fixed, but it does not properly follow the variation of the exhaust $NO_x$ flow rate; and the diagnosis is finished. When the absolute value D is less than the stipulated value ABS, the processing goes to step S171 to determine whether the firmly fixing TestOK flag is put up. When the firmly fixing TestOK flag is put up, the responsiveness TestError is determined because it is determined that the NO sensor is not firmly fixed, but it does not properly follow the variation of the exhaust $NO_x$ flow rate, and thus the diagnosis is finished.

When the firmly fixing TestOK flag is not put up in step S171, it is determined in step S172 whether the timer 6 is operated. When the timer 6 is finished, the firmly fixing TestError is determined because it is determined that the $NO_x$ sensor hardly responds even when a predetermined time elapses, and thus the diagnosis is finished. On the other hand, when the timer 6 is actuated, the processing goes to step S173 to determine whether the test environment condition is satisfied. When it is satisfied, the processing is returned to step S170. On the other hand, when it is not satisfied, it is processed as the responsiveness TestError because it is determined that the $NO_x$ sensor gets out of the test environment condition under the state that it has not yet led to the determination of the firm fixing, and thus the diagnosis is finished.

INDUSTRIAL APPLICABILITY

According to the $NO_x$ sensor trouble diagnosis method based on the flowchart described above, the $NO_x$ sensor trouble diagnosis can be performed on a timely basis in the normal operation state without intentionally creating any diagnosis mode. Accordingly, the responsiveness of the $NO_x$ sensor can be determined without deteriorating the drivability and the fuel consumption.

The construction of the exhaust gas purification system is an example, and the exhaust gas purification system that can implement the $NO_x$ sensor trouble diagnosis method of the present invention is not limited to the thus-constructed exhaust gas purification system. For example, CAN may be omitted, and DCU may be constructed integrally with the engine ECU. Furthermore, as another example, the exhaust gas purification system may be constructed so that the circulation passage provided for the purpose of the temperature control of reducing agent is omitted.

Furthermore, various alterations may be made to the flow of the trouble diagnosis method.

The invention claimed is:

1. An $NO_x$ sensor trouble diagnosis device that is provided in an exhaust gas passage of an internal combustion engine and detects a concentration of $NO_x$ in exhaust gas passing through the exhaust gas passage, the device comprising:

an exhaust $NO_x$ flow rate calculator and storage apparatus for calculating and storing an exhaust $NO_x$ flow rate discharged from an internal combustion engine per unit time;

a detected $NO_x$ concentration apparatus for storing a detected $NO_x$ concentration detected by an $NO_x$ sensor; and a trouble determining apparatus means for defining a reference pattern as a time-lapse variation reference of the exhaust $NO_x$ flow rate and a follow pattern as a time-lapse variation reference of the detected $NO_x$ concentration detected by the $NO_x$ sensor, and determining whether the detected $NO_x$ concentration undergoes a transition while having a predetermined relation with the follow pattern when the exhaust $NO_x$ flow rate undergoes a transition while having a predetermined relation with the reference pattern in a case where the internal combustion engine is in a normal operation mode, to determine the responsiveness of the $NO_x$ sensor.

\* \* \* \* \*